United States Patent
Jajara et al.

(10) Patent No.: US 10,311,439 B2
(45) Date of Patent: Jun. 4, 2019

(54) SYSTEMS AND METHODS FOR FACILITATING OFFLINE PAYMENTS

(71) Applicant: PayPal, Inc., San Jose, CA (US)

(72) Inventors: Pawankumar Jajara, San Jose, CA (US); Ravi Kumar Singh, Cupertino, CA (US)

(73) Assignee: PAYPAL, INC., San Jose, TX (US)

( * ) Notice: Subject to any disclaimer, the term of this patent is extended or adjusted under 35 U.S.C. 154(b) by 613 days.

(21) Appl. No.: 14/515,447

(22) Filed: Oct. 15, 2014

(65) Prior Publication Data

US 2016/0110718 A1 Apr. 21, 2016

(51) Int. Cl.
G06Q 20/10 (2012.01)
G06Q 20/40 (2012.01)
G06Q 20/32 (2012.01)

(52) U.S. Cl.
CPC ....... *G06Q 20/4016* (2013.01); *G06Q 20/322* (2013.01); *G06Q 2220/00* (2013.01)

(58) Field of Classification Search
USPC ...................................... 705/35–44
See application file for complete search history.

(56) References Cited

U.S. PATENT DOCUMENTS

| | | | |
|---|---|---|---|
| 2008/0177668 A1* | 7/2008 | Delean .................. | G06Q 20/10 705/76 |
| 2012/0245985 A1* | 9/2012 | Cho ....................... | G06Q 20/16 705/14.23 |
| 2013/0151405 A1* | 6/2013 | Head ..................... | G06O 20/36 705/41 |
| 2013/0185214 A1* | 7/2013 | Azen .................... | G06O 20/206 705/76 |
| 2014/0279502 A1* | 9/2014 | Dooley ................. | G06Q 20/12 705/44 |
| 2015/0229750 A1* | 8/2015 | Zhou .................... | H04M 1/72522 705/44 |
| 2015/0278796 A1* | 10/2015 | Jiang .................... | G06O 20/327 705/44 |
| 2015/0302397 A1* | 10/2015 | Kalgi ..................... | G06Q 20/36 705/65 |

OTHER PUBLICATIONS

Funds Transfer, payment System and Sequrities Settlement.*
On-Device Offline Purchases.*
Topping up prepaid payment cards for offline payments.*
Payment management on mobile devices.*

* cited by examiner

*Primary Examiner* — Hani M Kazimi
*Assistant Examiner* — Hatem M Ali
(74) *Attorney, Agent, or Firm* — Haynes and Boone, LLP

(57) ABSTRACT

Systems and methods are provided for secure offline transactions using a mobile device. The mobile device may include an encrypted data store in which encrypted payment processing data is stored, a risk assessment engine configured to retrieve the encrypted payment processing data and determine, based on the encrypted payment processing data, whether an offline payment is authorized, and a transaction pool configured to store the offline payment after the offline payment has been provided to a recipient. The mobile device may provide the offline payment that has been performed to a payment provider server for completion and/or funding when the mobile device obtains a network connection to the payment provider server following the offline payment.

20 Claims, 7 Drawing Sheets

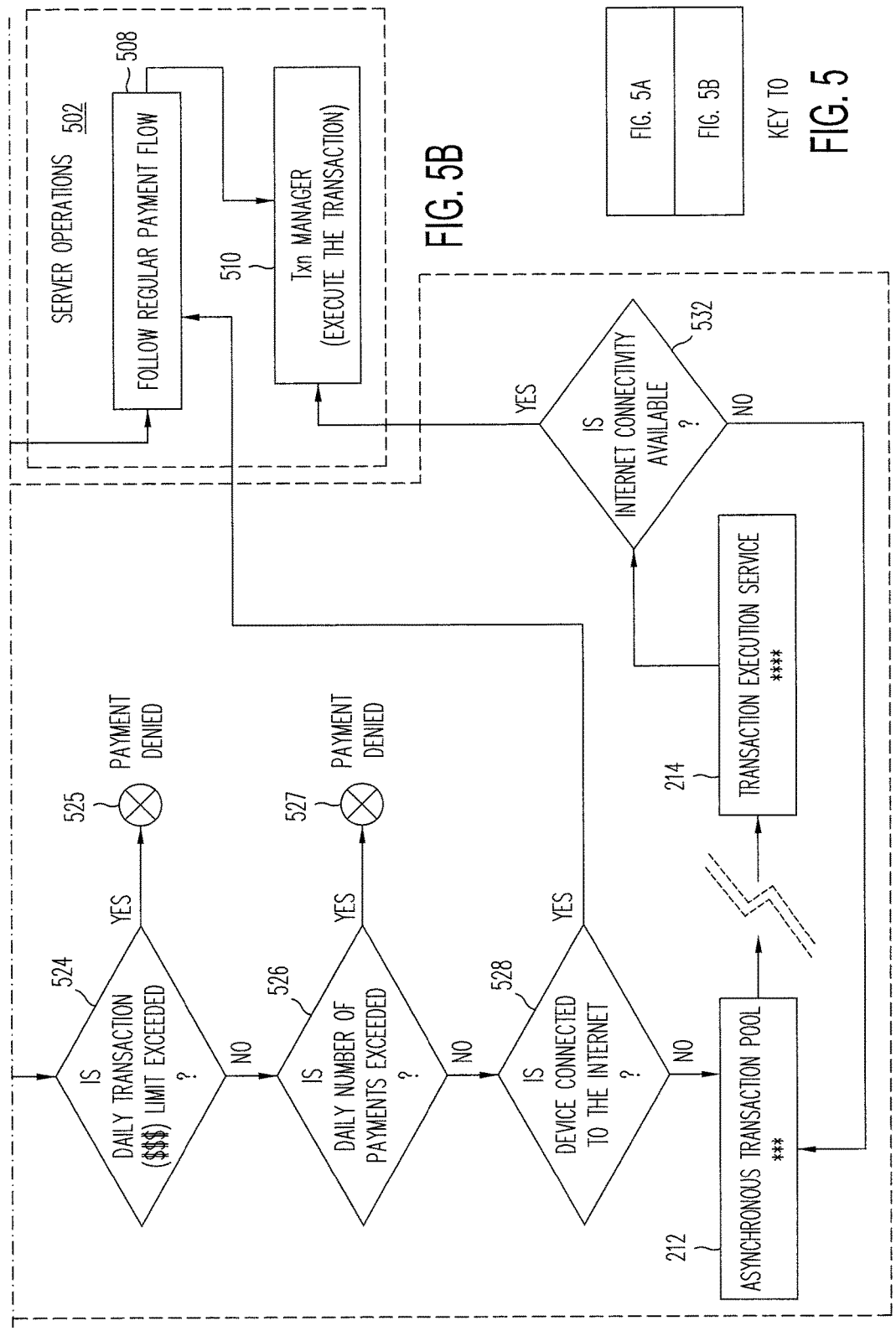

SYSTEMS AND METHODS FOR FACILITATING OFFLINE PAYMENTS

BACKGROUND

Field of the Invention

The present invention generally relates to mobile devices and, more particularly, to systems and methods for facilitating secure offline payments using mobile devices.

Related Art

Computer systems and networks can facilitate the tasks of buying, selling and transferring goods and services in retail and other marketplaces. For example, a consumer can pay for an item from either an online merchant or at a point of sale of a brick-and-mortar store through the use of a payment provider that can be accessed on his or her smart phone, tablet, laptop computer, desktop computer, or other personal mobile or desktop device. In particular, users of a payment provider can use the payment provider website or a payment provider application or "app" on a mobile device to make payments to various merchants.

These mobile device payments typically require a network connection to perform authentication and security operations, to access user accounts to fund the payment, and to ensure that a payer is authorized to make the payment.

However, in some situations, a payer or receiver of funds may not want or be able to access a network connection, yet may still desire to transfer funds using their mobile device.

BRIEF DESCRIPTION OF THE FIGURES

FIGS. 5A and 5B of FIG. 5 combine to show a flow diagram of an illustrative process for securely processing offline mobile device payments according to an embodiment.

Figure 1:
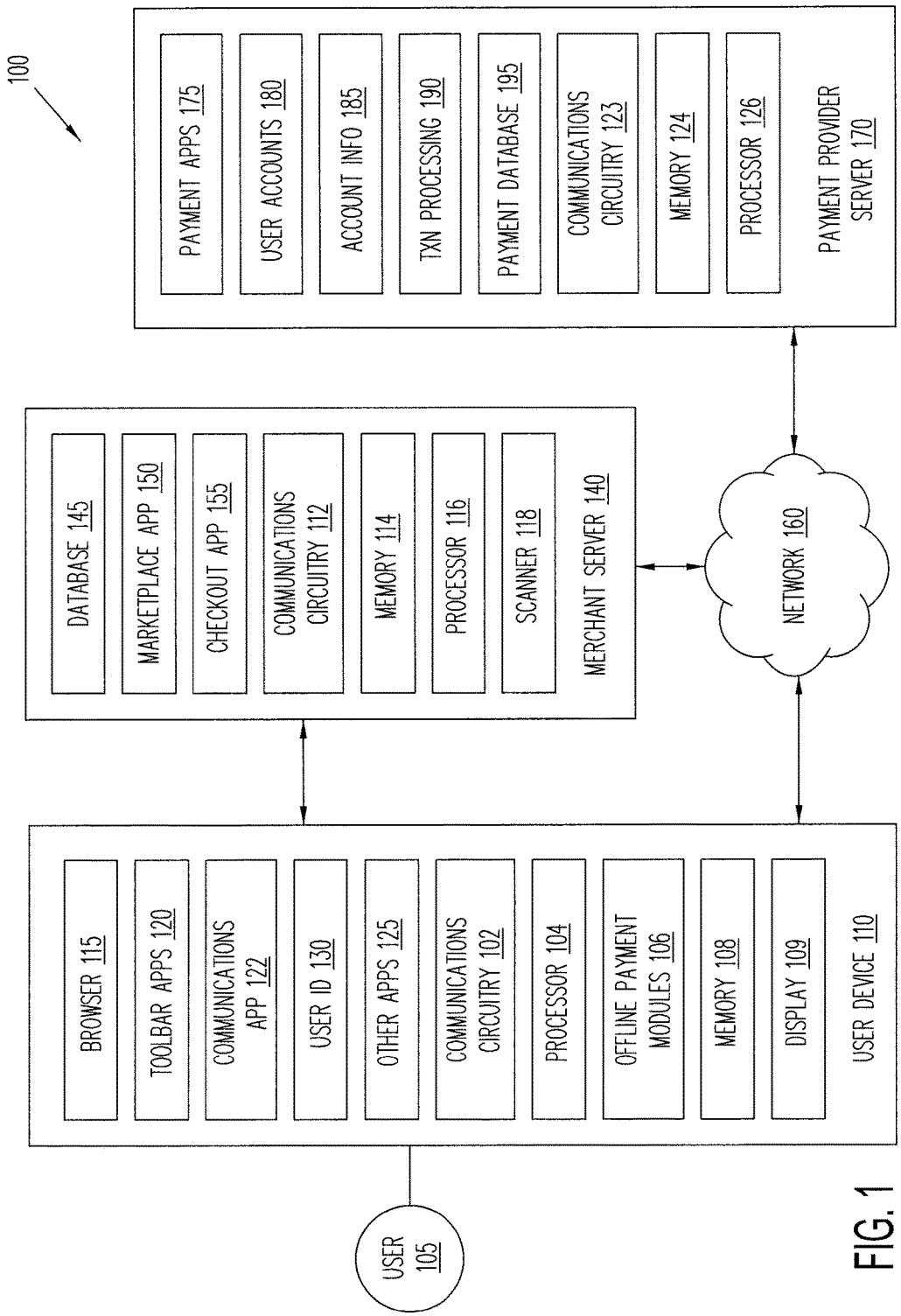
FIG. 1 is a block diagram of an illustrative networked system suitable for implementing a process for facilitating secure offline mobile device transactions according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Exemplary systems and methods according to the present disclosure are described in this section. These examples are being provided solely to add context and aid in the understanding of the invention. It will thus be apparent to one skilled in the art that the present invention may be practiced without some or all of these specific details. In other instances, well known system components and/or process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing secure offline transactions such as payments. In various particular embodiments, the devices, systems or methods can involve one or more devices in direct communication and/or in communication over a network. Such devices, systems, and methods can facilitate the execution of secure offline payments using a user's mobile device. A system for secure offline payments may include a mobile device having various offline payment modules that accumulate, encrypt, and/or store information to be used for securing a payment with the mobile device without accessing a network. The accumulated, encrypted, and/or stored information may include risk assessment information, offline payment prerequisite information, payment limit information, and/or pooled payment information. Some or all of the stored information may be encrypted such that the information is only accessible to one or more of the offline payment modules for payment processing and is not accessible to a user of the mobile device including the owner of the mobile device. The offline payment modules of the mobile device may cooperate to process and store offline payments that, when the mobile device is later connected to a network, are provided to a payment provider server over the network for funding of the offline payments.

While the various examples disclosed herein focus on particular aspects regarding the online transactions, it will be understood that the various inventive principles and embodiments disclosed herein can be applied to other types of transactions and arrangements as well.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Beginning with FIG. 1, a block diagram is shown of a networked system 100 suitable for implementing a process for processing secure offline payments. Networked system 100 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX®

OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160 when, for example, network 160 is available to user device 110, merchant server 140 and payment provider server 170. Payment provider server 170 may be maintained by a payment service provider, such as PayPal, Inc. of San Jose, Calif. A user 105, such as a sender or consumer, utilizes user device 110 to perform a transaction such as an electronic commerce transaction using user device 110 and/or payment provider server 170. A user 105 may utilize user device 110 to initiate a payment transaction, receive a transaction approval request, or reply to the request. A user 105 may utilize user device 110 to perform offline transactions via direct communication with merchant server 140. Note that transaction, as used herein, refers to any suitable action performed using the user device, including payments, transfer of information, display of information, purchases, sales, online listings, etc. For example, user 105 may utilize user device 110 to initiate a deposit into a savings account. Although only one merchant server is shown, a plurality of merchant servers may be included in system 100 at various times (e.g., when the user is purchasing products or services from multiple merchants or individuals).

User device 110, merchant server 140, and payment provider server 170 may each include one or more processors, memories, and other appropriate components for managing operation of offline payment modules and/or executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using hardware and software configured for wired and/or wireless communication over network 160 and/or wired and/or wireless communication directly with merchant server 140. For example, in one embodiment, user device 110 may be implemented as a personal computer (PC), a smart phone, personal digital assistant (PDA), laptop computer, and/or other types of computing devices capable of transmitting and/or receiving data, such as an IPHONE®, IPAD® or wearable device from APPLE®. User device 110 may include a processor 104, a memory 108, a display 109 and/or one or more offline payment modules 106 that cooperate to perform offline payment operations such as payments to merchant server 140 such as a computing device or other server of a brick-and-mortar merchant, an online merchant, and/or an individual.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a digital wallet through the payment provider as discussed herein. User device 110 may include one or more user identifiers 130 which may be implemented, for example, as operating system registry entries, cookies associated with browser application 115, identifiers associated with hardware of user device 110, or other appropriate identifiers, such as identifiers for payment/user/device authentication. In one embodiment, user identifier 130 may be used by a payment service provider to associate user 105 with a particular account maintained by the payment provider. A communications application 122, with associated interfaces such as communications circuitry 102, enables user device 110 to communicate within system 100 (e.g., over network 160 and/or directly with a merchant or individual device).

Offline payment modules 106 may include various modules for accumulating, storing, encrypting, and/or comparing data associated with a user, a payment, a merchant, a purchase history, a location, and/or other information for securely processing a payment with user device 110 when user device 110 is not connected to network 160. When user device 110 is connected to network 160, offline payment modules 106 may redirect payment operations to online payment operations processed by, or in cooperation with, payment provider server 170. When user device 110 is not connected to network 160, offline payment modules 106 may perform payment operations to provide a payment to merchant server 140 (or an individual recipient or group of recipients) without communications with server 170. Offline payment modules 106 may pool offline payments to be provided to payment provider server 170 via network 160 when a connection to network 160 is later detected.

User derive 110 also may collect location data using Global Positioning System (GPS) circuitry to identify a location of user device 110. Other means for collecting location data, such as WiFi devices, Near-Field Communication (NFC) devices, or the like also may be included in user device 110 for determining a location of user device 110. Thus, user device 110 may determine a current location of user device 110 and/or a history of locations of user device 110 based on the collected location data. In another embodiment, user device 110 may send the location data to payment provider server 170 and payment provider server 170 may determine a current location of user device 110 based on the location data.

Merchant server 140 may be maintained, for example, by a merchant or seller offering various products and/or services or more generally any recipient of funds. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a bank account such as a savings account.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160 and/or from user device 110 directly. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like. In another example, checkout application 155 may receive and process a payment confirmation from user device 110 (e.g., using a scanner such as a code scanner or by receiving other communications directly from user device 110), as well as transmit transaction information to the user device and receive information from the user device (e.g., a transaction ID) when the user device is not connected to network 160.

Merchant server 140 may include a processor 116, a memory 114, communications circuitry 112, a scanner 118 and/or other components or devices that cooperate to receive offline payments from user device 110 and/or online payments from payment provider server 170.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110. In circumstances in which user device 110 is not connected to network 160, user device 110 may perform secure offline payment operations with merchant server 140 and payment provider server may later receive pooled payment information associated with the secure offline payments and may then fund the previously provided secure offline payments (e.g., by transferring funds from a user funding source (e.g., a credit card, a bank account, or an account with payment provider server 170)).

Payment provider server 170 may include may include a processor 126, a memory 124, communications circuitry 123 and/or one or more payment engines for processing real time (e.g., online) payments and/or previously provided offline payments received from a user device.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Account information may also include information associated with particular transactions such as payments (e.g., payments of a particular dollar amount). Payment application 175 may be configured to interact with merchant server 140 on behalf of user 105 during a transaction with checkout application 155 to track and manage purchases made by users and which and when funding sources are used. Payment application 175 may be configured to determine the existence of and to manage accounts for user 105, as well as create new accounts if necessary. Payment application 175 may be configured to execute one or more payment transactions in response to receiving payment requests from user device 110 and/or merchant server 140.

A transaction execution engine such as a transaction processing engine 190, which may be part of payment application 175 or may be separate from application 175, may be configured to receive information from user device 110 and/or merchant server 140 for processing and storage in a payment database 195. Transaction processing engine 190 may include one or more applications for processing information from user 105 for processing an order, for funding previous offline payments, and for payment using various selected funding instruments, including operations for initial purchase and for payment after purchase as described herein. As such, transaction processing engine 190 may store details of an order from individual users, including a funding source used, available credit options, etc. Transaction processing engine 190 may be configured to execute one or more transactions such as electronic commerce transactions in response to receiving one or more pooled transactions from a user device that has performed secure offline transactions.

One or more of merchant server 140, payment provider server 170, and user device 110 may be used to execute any suitable transaction. As examples, any or all of merchant server 140, payment provider server 170, and user device 110 may execute a payment of a particular dollar amount from a particular funding source to a particular merchant, may list for sale a product at a particular price for a particular time period on a merchant website, may initiate delivery of a purchased item from a seller, may accept an offer from a potential buyer, may alter details of a currently listed product for sale, or may execute any other suitable transaction performed partially or completely online.

In one particular situation that is sometimes discussed herein as an example, offline payment modules 106 of user device 110 may accumulate and store information such as user behavior information, user location history information, user spending pattern information, daily transaction limits, daily transaction number limits, account information, and/or other information that can be used to ensure that, when a user attempts to use user device 110 to make a payment when user device 110 is offline, the user is the owner of the user device and/or is authorized to make a payment using the device. User device 110 may accumulate and store information such as user behavior information, user location history information, user spending pattern information, daily transaction limits, daily transaction number limits, account information, and/or other information throughout the lifetime of the user device during, for example, online operations of user device 110. User device 110 may accumulate and store information such as user behavior information, user location history information, user spending pattern information, daily transaction limits, daily transaction number limits, account information, and/or other information directly or may receive some or all of the information from a payment provider server that has accumulated the information (e.g., when offline payments are enabled, the information may be transferred to the user device from the payment provider server).

Figure 2:
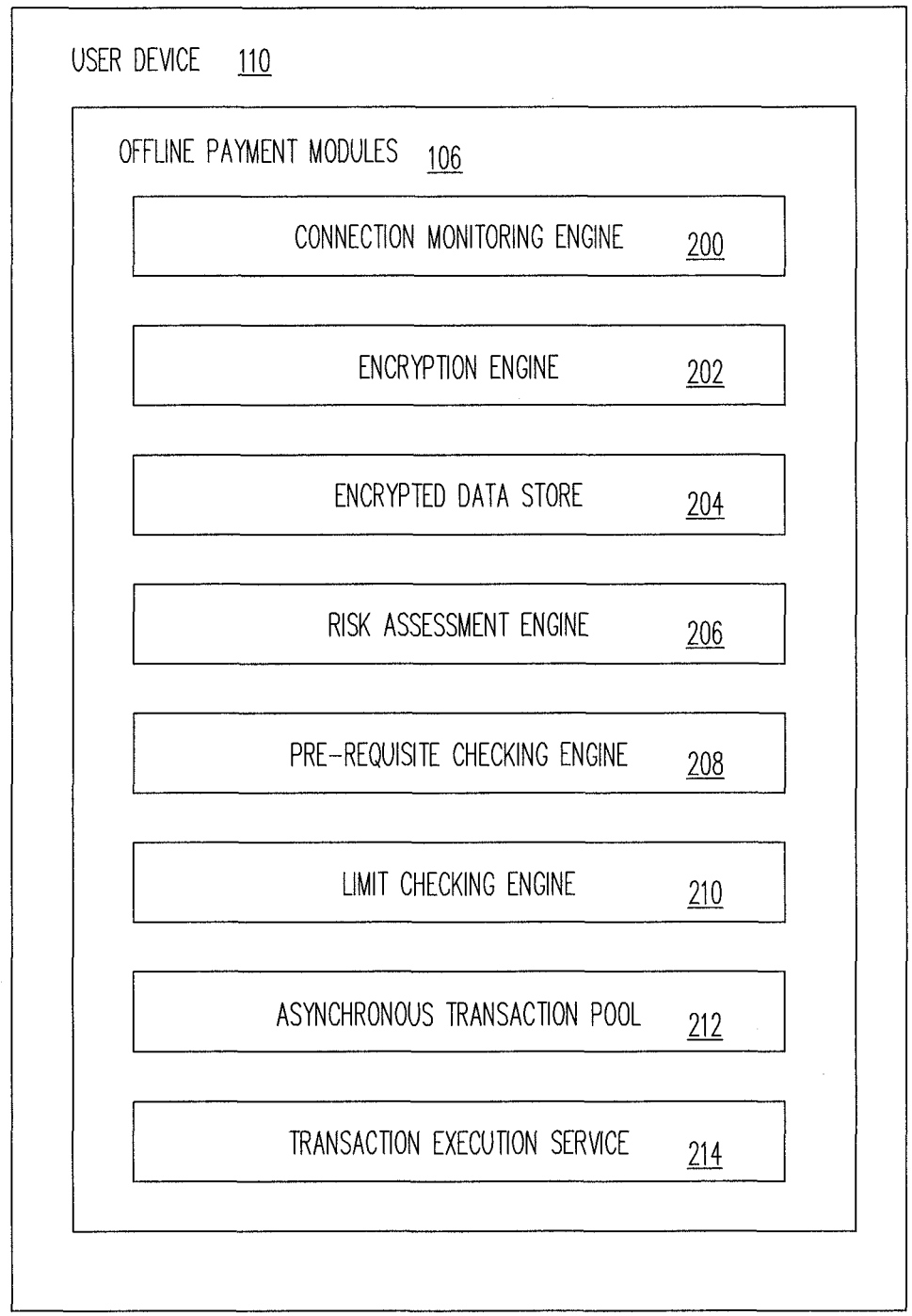
FIG. 2 is a diagram of an illustrative user device having offline payment modules according to an embodiment.

FIG. 2 shows an example of a user device having offline payment modules in accordance with an embodiment. As shown in FIG. 2, a user device 110 may have one or more offline payment modules 106 that include a connection monitoring engine 200, an encryption engine 202, an encrypted data store 204, a risk assessment engine 206, a pre-requisite checking engine 208, a limit checking engine 210, a pool such as an asynchronous transaction pool 212, and a transaction execution service 214. Offline payment modules 106 may perform some or all of the operations described hereinafter in connection with, for example, FIGS. 4 and 5.

For example, connection monitoring engine 200 may be used to check for a network connection for user device 110. Connection monitoring engine 200 may check for a network connection periodically and/or at various times during a transaction. Encryption engine may be used to encrypt data such as risk assessment data, pre-requisite data, and/or other transaction data to be stored in encrypted data store 204 and/or used by risk assessment engine 206, pre-requisite checking engine 208, and/or limit checking engine 210 during offline payments using user device 110. Asynchronous transaction pool 212 may be used to store offline payments or other offline transactions (e.g., information such as monetary amounts, recipient identities such as merchant identities, payment times, transaction types, and/or other payment or other transaction information) associated with payments or other transactions that have been made offline with the user device to a recipient such as a merchant. Offline transactions stored in pool 212 may be provided to a payment provider server for completion (e.g., funding) by transaction execution service 214.

Any or all of modules 106 may be implemented as a subsystem of the device 110 including for example, a circuit, a hardware component, a hardware subcomponent, and/or a variety of other subsystems or combinations known in the art. Furthermore, any or all of the modules 106 may be preconfigured to perform their disclosed functionality, or may be configured by a processing system "on-the-fly" or as needed to perform their disclosed functionality. As such, any or all of the modules 106 may include pre-configured and dedicated circuits and/or hardware components of the mobile device 110, or may be circuits and/or hardware components that are configured as needed.

For example, any or all of the modules 106 may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules 106 to perform the functions described above. As such, in some embodiments, preconfigured and dedicated circuits may be implemented to perform the functions of the modules 106. In other embodiments, a processing system may execute instructions on a non-transitory, computer-readable medium to configure one or more circuits as needed to perform the functions of the modules 106.

A communications module (see, e.g., communications circuitry 102 of FIG. 1) may be included in device 110 as a separate module or may be provided using instructions stored on a computer-readable medium that, when executed by a processing system in the device 110, configure the communications module to send and receive information over a network as, for example, described herein, as well as provide any of the other functionality that is discussed above. Any or all of modules 106 may be included as a separate module provided in the device 110, or may be provided using instructions stored on a computer-readable medium that, when executed by a processing system in the device 110, configure that module to provide any of the functionality that is discussed herein.

Figure 3:
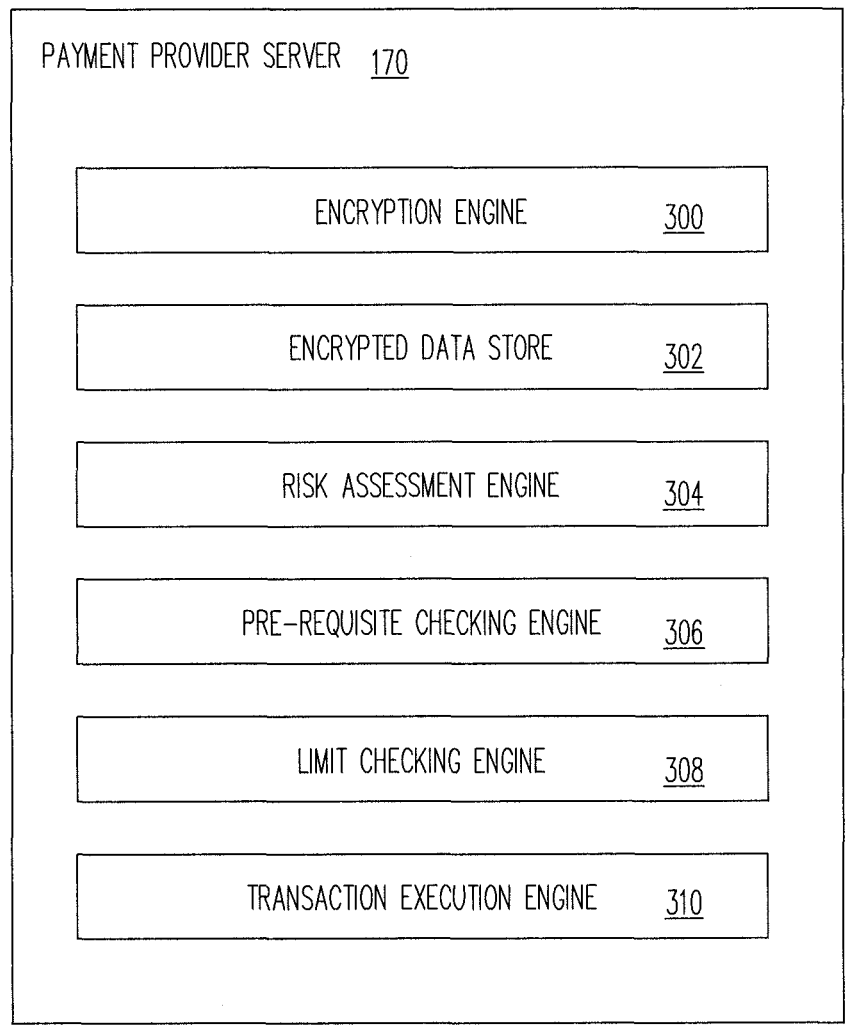
FIG. 3 is a diagram of an illustrative payment provider server having modules for processing payments according to an embodiment.

FIG. 3 shows an example of a payment provider server having online payment processing circuitry in accordance with an embodiment. As shown in FIG. 3, payment provider server 170 may include an encryption engine 300, an encrypted data store 302, a risk assessment engine 304, a pre-requisite checking engine 306, a limit checking engine 308, and a transaction execution engine 310. Transaction execution engine 310 may, for example, be an implementation of transaction processing engine 190 of FIG. 1. Encryption engine 300, encrypted data store 302, risk assessment engine 304, pre-requisite checking engine 306, limit checking engine 308, and transaction execution engine 310 may cooperate to process online transactions for a user when the user's mobile device is in communication with the server and/or to complete (e.g., fund) previously-provided offline payments received from the user device when the user device obtains a connection to the server. For example, transaction execution engine 310 may receive one or more pooled and previously provided offline payments from transaction execution service 214 of user device 110. The pooled and previously provided payments may have been made by the user with the user device while the user device was offline and disconnected from server 170. The pooled and previously provided payments may be provided to server 170 for completion and/or funding of the payments (e.g., from one or more user accounts).

Figure 4:
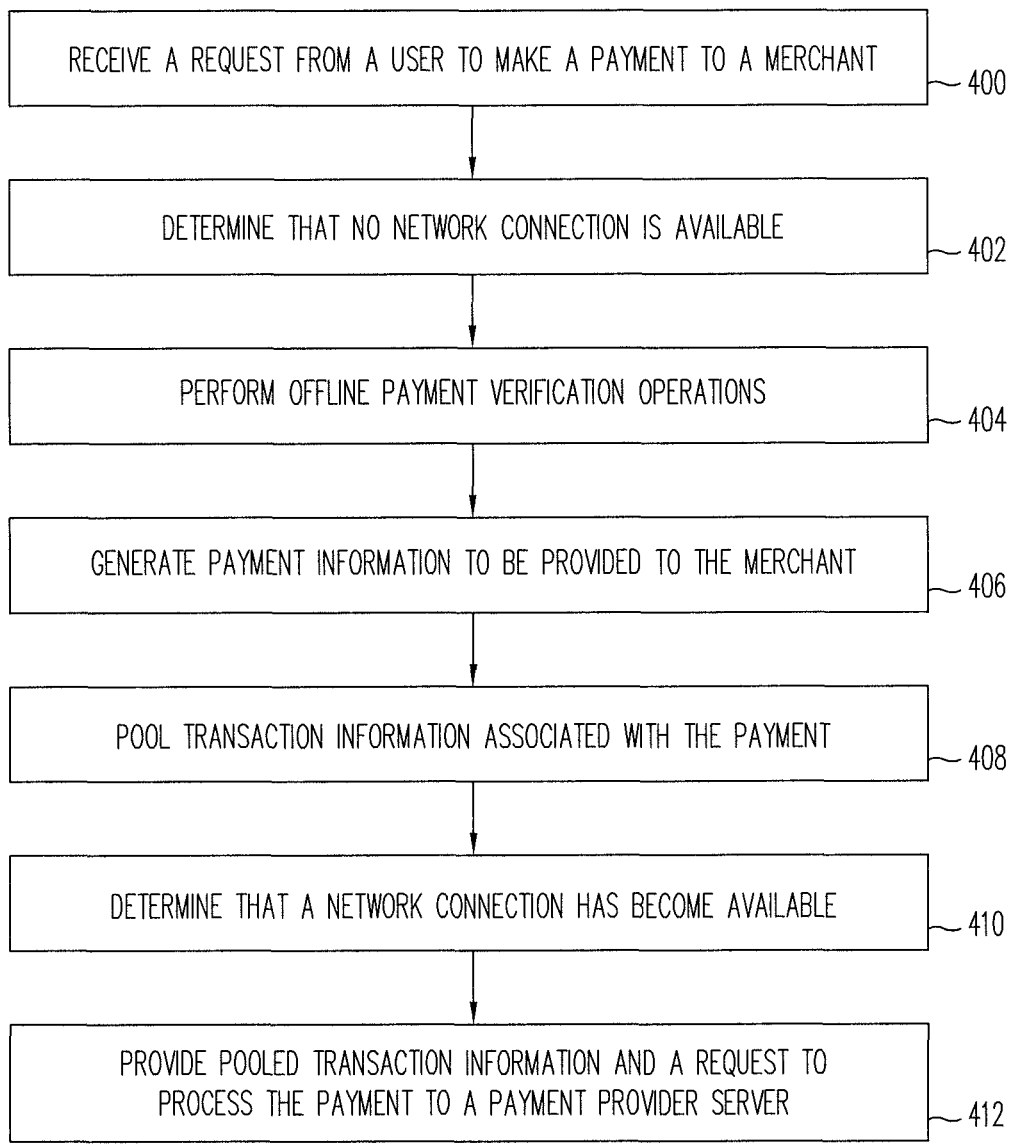
FIG. 4 is a flowchart showing an illustrative process for securely processing transactions with an offline mobile device according to an embodiment.

FIG. 4 is a flowchart showing illustrative operations in a process for offline payments according to one embodiment.

At step 400, a user device may receive a request to make a payment to a merchant. For example, the user may scan one or more bar codes for products to purchase using, for example, user device 110 of FIG. 1, the user device may receive a payment request via near field or other communication with a merchant device or a recipient device, or the user device may receive the request via user input from the user.

At step 402, the user device may determine that no network connection is available. For example, responsive to the payment request, connection monitoring engine 200 of FIG. 2 may check for a network connection and determine that the user device is not connected to a network. The network connection may be unavailable due to a lack of network service from a provider (e.g., in remote areas or in locations in which network signals are blocked) or due to the user purposefully disconnecting the device from the network (e.g., to save battery, protect privacy, etc.). In one example use case, a user of a smartphone may be running low on battery power and turn off Wi-Fi/4G service to conserve power, but may still desire to use the device to purchase coffee at a coffee vendor. In another example use case, a user of a smartphone may only have recently started using the smartphone and may not know how to connect to the internet in a particular location, yet may have experience and desire to pay a friend for a shared expense with the smartphone.

At step 404, the user device may perform offline payment verification operations. Offline payment verification operations may include various comparisons of transaction information associated with the requested transaction with stored, encrypted verification data stored on the user device. The comparisons of the transaction information with the stored verification data may be used to ensure that the person attempting to use the user device to perform a transaction is the owner of the user device and/or the owner of a payment account on the user device, as well as ensuring any account and/or payment restrictions are met. For example, offline payment verification operations may include risk assessment operations such as a user behavior analysis, a user location history analysis, and/or a user spending pattern analysis. Offline payment verification operations may also include limit checking operations such as a daily, weekly, monthly, yearly, or other time dependent monetary limits on transactions, a daily, weekly, monthly, yearly, or other time dependent number of payments limit, or other limit check. In this way, the user device, even without the aid of a current network connection, can perform secure transactions such as payments for a user while protecting the user against fraudulent use of their device.

Risk assessment data may be captured continuously throughout the life of the user device (e.g., during any or all purchase, payment, or other financial transactions, during any movement of the device from location to location, or when email or other electronic receipts or other communications associated with products, locations, transactions, or other user behavior are received and/or transmitted). Risk assessment data captured before a particular offline transaction is performed may be encrypted and stored on the user device so that the risk assessment data is available for analysis of user behavior, location, spending, and/or other patterns on the user device during processing of offline transactions. As a user starts and continues using the offline mode for making payments, analysis can also be done of a total percentage of offline transactions in comparison with online transactions and of other characteristics of offline payments to enhance future offline payments and/or other transaction services of a system such as system 100 of FIG. 1.

Risk assessment data may be encrypted in such a way that a user of the device is prevented from accessing and/or modifying the risk assessment data to further protect against fraudulent use of the device for transactions. For example, if a user device is stolen, a thief is prevented by the encryption from modifying risk assessment data on the user device to allow the thief to use the device or payments.

At step 406, the user device may generate payment information such as a scannable code (e.g., a barcode or QR code), a series of characters (e.g., numbers, letters, and/or symbols), a funding instrument number, an account number, or other payment authorization information to be provided to the merchant or other recipient of funds via the offline transaction.

At step 408, the user device may pool transaction information associated with the offline payment. For example, transaction information may be stored in a data pool on the user device (e.g., transaction pool 212 of FIG. 2) for all offline payments or other offline transactions executed by the user device while the user device has been disconnected from a network.

At step 410, the user device may determine that a network connection has become available (e.g., following providing the payment authorization information to the merchant or other recipient).

At step 412, the user device may provide the pooled transaction information and a request to process and/or complete (e.g., fund) the payment to a payment provider server. In this way, a user device may be provided that can seamlessly be used to perform transactions for the user without any disruptions due to network service availability.

Figure 5A:
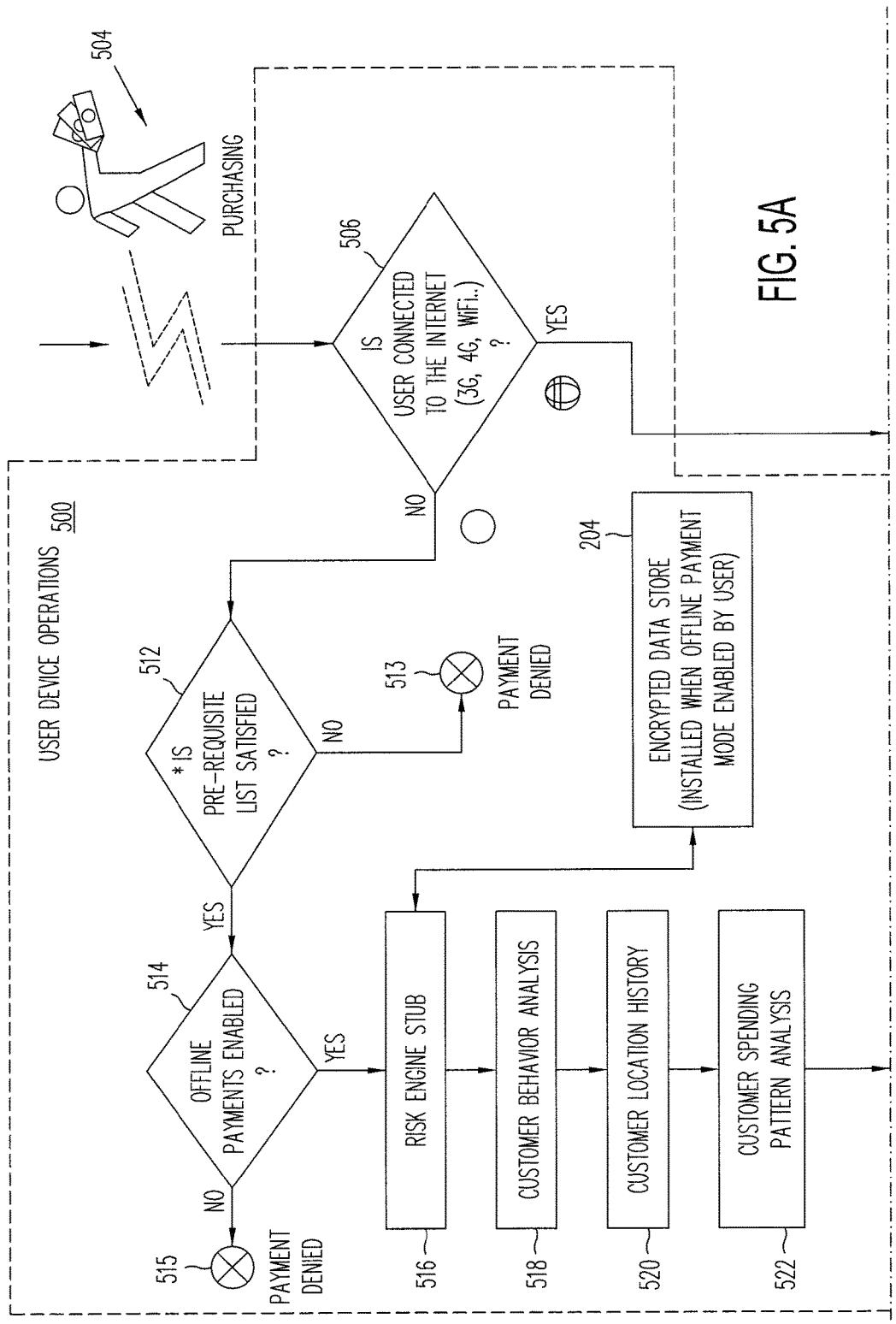

Further details of operations that may be performed by a user's mobile device and a payment provider server are shown in FIGS. 5A and 5B of FIG. 5 (which show top and bottom portions of FIG. 5 as indicated by the key to FIG. 5 as shown).

As shown in FIG. 5, user device operations 500 may be generally be performed to process an offline transaction such as an offline payment with a user device when the user device is offline and server operations 502 may generally be performed by a payment provider server when the user device has a network connection (e.g., is online).

As shown, user device operations 500 may include, following a transaction such as a purchase operation 504 that includes a request to provide a payment to a merchant or other recipient, determining at block 506 whether the user is connected to a network. If the user is connected to the network, at block 508, the payment provider server may process the payment using a normal server payment flow at block 508 and execute the transaction using the transaction manager 510 to execute the transaction.

If the user is not connected to the network (e.g., as determined by connection monitoring engine 200 of FIG. 2), the user device may proceed to block 512. At block 512 the user device may determine whether offline payment pre-requisites have been met (e.g., using pre-requisite checking engine 208 of FIG. 2). Offline payment pre-requisites may include user profile pre-requisites (e.g., a requirement that a user profile for the user exists and/or that the user has made payment with the payment provider server before), a location-services pre-requisite (e.g., a requirement that GPS location services are enabled), a user-shopping pre-requisite (e.g., a requirement that user shopping interests or a shopping profile are available), and/or a merchant pre-requisite (e.g., a requirement that offline payments are enabled by the merchant or other recipient).

If the pre-requisites are not satisfied, the user device may proceed to block 513 at which the offline payment is denied. If the pre-requisites are satisfied, the user device may proceed to block 514 at which it is determined whether offline payments are enabled on the user device. If offline payments are not enabled, the user device may proceed to block 515 at which the offline payment is denied. If offline payments are enabled, the user device may proceed to block 516 at which risk assessment operations may be initiated for the offline payment (e.g., by risk assessment engine 206 of FIG. 2). Risk assessment operations may include accessing encrypted risk assessment data from encrypted data store 204 (e.g., a data store generated and maintained on the user device following enabling of offline payments on the user device by the user). Risk analysis operations may include customer behavior analysis operations, location history analysis operations, customer spending pattern analysis operations, and/or other customer analysis operations to ensure that the person requesting the transaction is authorized to perform the transaction.

At block 518, customer behavior analysis operations may be performed to determine whether the offline payment is consistent with the user's previous behavior for risk analysis for the offline payment. For example, customer behavior analysis operations may include determining whether the time of an attempted purchase is consistent with the known behavior of the user (e.g., whether the user is typically at work or typically at home sleeping at the time of the purchase). As another example, customer behavior analysis operations may include determining whether the user typically makes offline payments at the merchant or recipient of the attempted payment. As another example, customer behavior analysis may include device movement and/or device usage behavior (e.g., determining whether device movements or usage detected during the attempted offline payment are similar to the device movement and/or usage detected and stored during previous offline payments or online payments). Customer behavior information may be obtained during the lifetime of the user's device based on email information, social media information, or other user behavior data collected and/or received by the user's device.

At block 520 location history analysis operations may be performed to determine whether the location of the offline payment is consistent with the user's previous location history for risk analysis for the offline payment. For example, location history analysis operations may include determining whether an attempted payment is at a location at which the user has previously made payments (e.g., at a store, in a city, in a state, in a country, or in another geographic or merchant location at which the user has previously made payments). Location history analysis operations may be combined with customer behavior analysis operations. For example, even if an offline payment is not consistent with the user's previous location history (e.g., the attempted payment is in a city that the user has never visited), the offline payment may still may be consistent with the user's behavior and location if, for example, the location is in an area that user is expected to be based on the behavior information (such as from a calendar, hotel reservations, flight purchases, etc. of the user). In another example, if the last known location of the user was X miles away from current location of the attempted offline payment and it is unlikely the user could travel that distance in the time period since the last known location, a higher risk would be determined and the payment may be denied.

At block 522 customer spending pattern analysis operations may be performed to determine whether the offline payment is consistent with the user's previous spending patterns for risk analysis for the offline payment. For example, a user's purchase history may be used to determine whether an attempted offline payment is consistent with previous purchases of the user. For example, if the attempted offline payment is for boating equipment and the user has never purchased boating equipment or a boat, a higher risk may be determined and the offline payment may be denied. As another example, if the attempted offline payment is for an amount that is significantly higher than typical purchases by the user at the location or merchant of the offline payment, a higher risk may be determined and the payment may be denied. Customer spending pattern analysis operations may be combined with location history analysis operations and/or customer behavior analysis operations. For example, if the attempted offline payment is for boating equipment and the user has never purchased boating equipment, but the user behavior information stored on the device indicates that user is on vacation in Hawaii, the payment may be approved.

If risk assessment operations performed at blocks 516, 518, 520, and 522 determine that the offline payment is not acceptable, payment may be denied by the user device at any of blocks 516, 518, 520, and/or 522. For example, if, at block 520 it is determined that the purchase at block 504 is being made at a location at which the user has never been, the payment may be denied. As another example, if, at block 518 it is determined that the purchase at block 504 is being made at a time when the user is typically at work, the payment may be denied. As another example, if, at block 522 it is determined that the purchase at block 504 is being made for a product that is different from any product the user has ever purchased, the payment may be denied. Risk assessment engine 206 may approve or deny a payment based on the analysis at any, all, or any combination of the operations at blocks 516, 518, 520, and/or 522.

If risk assessment operations performed at blocks 516, 518, 520, and 522 determine that the offline payment is acceptable (authorized), the user device may proceed to block 524 at which it may be determined (e.g., by limit-checking engine 210 of FIG. 2) whether a daily monetary transaction limit for offline payments has been exceeded. If it is determined that the daily monetary transaction limit has been exceeded, the user device may proceed to block 525 at which the offline payment is denied. If it is determined that the daily monetary transaction limit has not been exceeded, the user device may proceed to block 526 at which it may be determined whether a daily number of transactions such as payments for offline payments has been exceeded. If it is determined that the daily number of transactions has been exceeded, the user device may proceed to block 527 at which the offline payment is denied.

If it is determined that the daily number of transactions has not been exceeded, the user device may proceed to block 528 at which it may again be determined whether the user device is connected to a network prior to proceeding with the offline payment. If it is determined that the user device is connected to a network (e.g., the user device has obtained a network connection following the determination at block 506 that the user device was not connected to the network), the system may proceed to block 508 to process the payment online as described above.

If it is determined that the user device is still offline, the offline payment may be stored in an offline payment pool such as asynchronous transaction pool 212 and offline payment authorization for the offline payment may be provided to the merchant (e.g., by generating a scannable code on the user device display or by communicating with a merchant device using short range communications such as NFC communications or Bluetooth communications). Transaction execution service 214 may periodically check at block 532 whether the user device has obtained a network connection and, when a network connection is obtained, transaction execution service 214 may provide any offline payments stored in pool 212 to the payment provider server to complete (e.g., fund) the previously made offline payments at block 510. In this way, offline payments subject to risk assessment and transaction limits can be provided with a user's mobile device whether or not the user device has a network connection.

Figure 6:
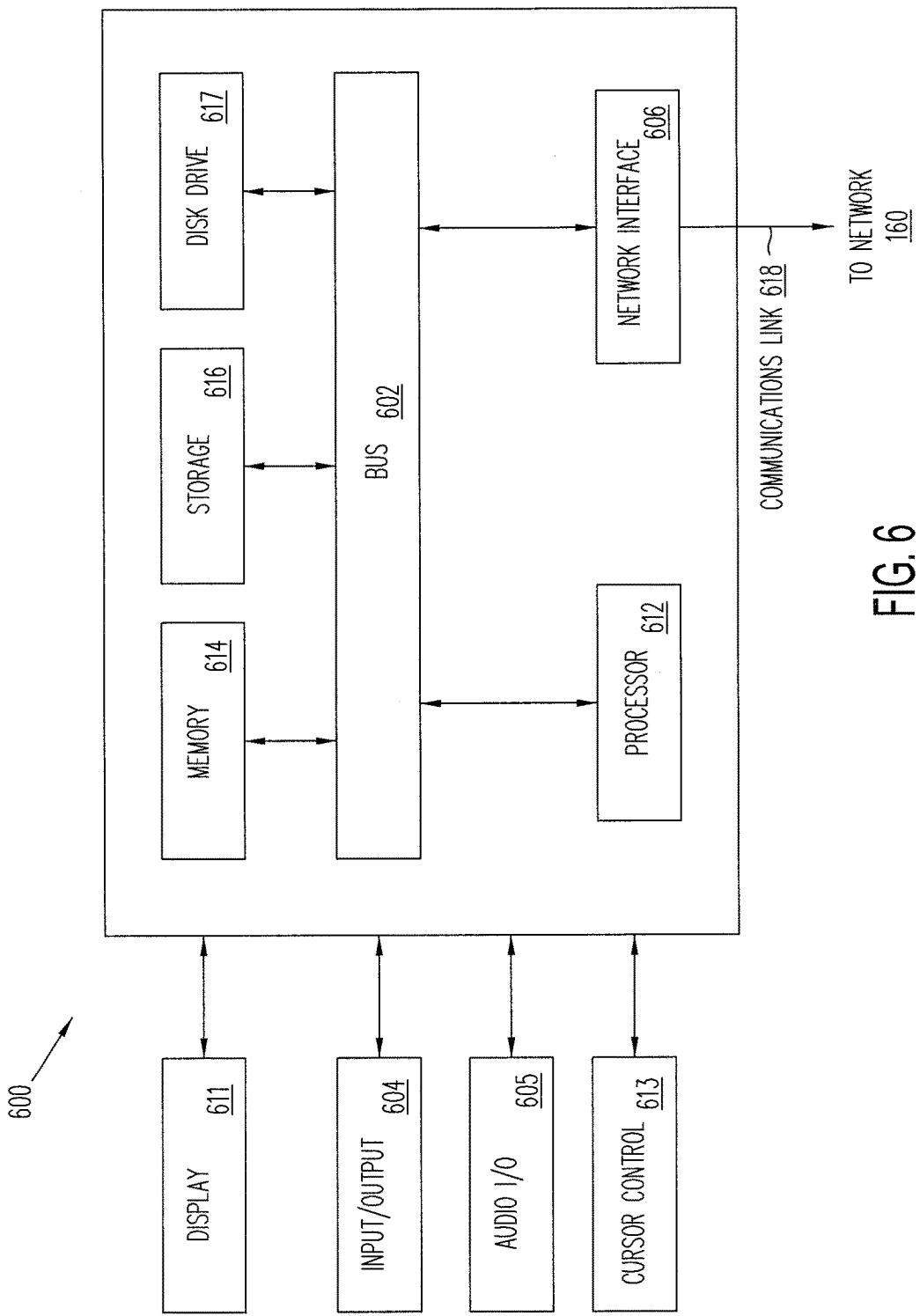
FIG. 6 is a block diagram of an illustrative computer system suitable for implementing one or more components in FIG. 1 according to an embodiment.

FIG. 6 is a block diagram of a computer system 600 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 413 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, a merchant server, or a payment provider server via network 160. In one embodiment, the transmission is wireless, although other transmission mediums and methods may also be suitable. A processor 612, which can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device, comprising:
a display;
a connection monitoring engine configured to detect an unavailability of a network connection;
an encrypted data store in which encrypted payment processing data is stored, the encrypted payment processing data including risk assessment data that is captured by the mobile device;
a risk assessment engine configured to:
retrieve, in response to the connection monitoring engine detecting the unavailability of the network connection, the encrypted payment processing data; and
determine, based on the encrypted payment processing data, whether an offline payment is authorized;
a communications interface configured to provide the offline payment to a recipient by generating a scannable code on the display of the mobile device or by communicating with a device of the recipient using NFC or Bluetooth; and
a transaction pool configured to store the offline payment after the offline payment has been provided to the recipient;
wherein the encrypted payment processing data comprises behavior information, location history information, or spending pattern information of a user of the mobile device, and wherein:
the behavior information includes a movement of the mobile device or a usage behavior of the mobile device during a previous offline transaction;
the location history information includes a previous location of the user when a previous offline transaction was conducted; and
the spending pattern information includes a previous purchase made by the user as a part of a previous offline transaction.

2. The mobile device of claim 1, wherein the communications interface is configured to provide the offline payment to the recipient while the network connection remains unavailable for the mobile device.

3. The mobile device of claim 1, further comprising:
a limit-checking engine configured to determine whether the offline payment exceeds a daily monetary limit or a daily transaction number limit.

4. The mobile device of claim 1, wherein the network connection comprises a cellular connection or a Wi-Fi connection, and wherein the mobile device further comprises a transaction execution service configured to provide the stored offline payment to a payment provider server when the mobile device is connected to a cellular or Wi-Fi network following the offline payment.

5. The mobile device of claim 1, further comprising a pre-requisite checking engine configured to determine whether a plurality of pre-requisites for offline payments are satisfied prior to operations of the risk assessment engine, wherein the plurality of pre-requisites include a user profile pre-requisite and a location services pre-requisite.

6. The mobile device of claim 1, wherein the risk assessment engine is configured to capture the risk assessment data during the movement of the mobile device from a first location to a second location.

7. A method, comprising:
capturing payment processing data with a mobile device of a user during online operations of the mobile device, the payment processing data including risk assessment data;
encrypting the captured payment processing data with the mobile device, the encrypting comprises encrypting the risk assessment data;
storing the encrypted payment processing data in an encrypted data store of the mobile device;
detecting, via a connection monitoring engine on the mobile device, that a cellular or Wi-Fi connection is unavailable for the mobile device;
retrieving, in response to the detecting, the encrypted payment processing data that is stored in the encrypted data store, the retrieving being performed with a risk assessment engine of the mobile device;
determining, based on the encrypted payment processing data, whether an offline payment is authorized, the determining being performed with the risk assessment engine;
providing, in response to the determining, the offline payment to a recipient by generating a scannable code on a display of the mobile device or by communicating with a device of the recipient using NFC or Bluetooth; and
storing the offline payment in a transaction pool on the mobile device after the offline payment has been provided to the recipient;
wherein the determining whether the offline payment is authorized with the risk assessment engine includes performing behavior analysis operations, performing location history analysis operations, or performing spending pattern analysis operations with the risk assessment engine, and wherein:
the performing of the behavior analysis operations includes comparing a current movement of the mobile device with a previous movement of the mobile device during a previous offline transaction or comparing a current usage behavior of the mobile device with a previous usage behavior of the mobile device during the previous offline transaction;
the performing of the location history analysis operations includes comparing a current location of the mobile device with a previous location of the mobile device when the previous offline transaction was conducted; and
the performing of the spending pattern analysis operations includes comparing a currently requested purchase with a previous purchase made by the user as a part of a previous offline transaction.

8. The method of claim 7, further comprising:
capturing the risk assessment data during the current movement or the previous movement of the mobile device from a first location to a second location.

9. The method of claim 7, further comprising, determining whether the offline payment exceeds a transaction limit for the mobile device to form the encrypted payment processing data.

10. The method of claim 7, further comprising:
determining that the mobile device is offline before the determining whether the offline payment is authorized; and
determining that the mobile device is offline after the determining whether the offline payment is authorized.

11. The method of claim 10, further comprising:
determining, following the storing, that the mobile device is online by detecting, via the connection monitoring engine, that the cellular or Wi-Fi connection is available for the mobile device; and
providing the stored offline payment to a payment provider server for funding of the offline payment by the payment provider server.

12. A system, comprising:
a mobile device, including:
a display;
a connection monitoring engine configured to detect an unavailability of a cellular or Wi-Fi connection;
an encrypted data store in which encrypted transaction processing data is stored, the encrypted transaction processing data including risk assessment data that is captured by the mobile device;
a risk assessment engine configured to:
retrieve, in response to the connection monitoring engine detecting the unavailability of the cellular or Wi-Fi connection, the encrypted transaction processing data; and
determine, based on the encrypted transaction processing data, whether an offline transaction is authorized while the cellular or Wi-Fi connection remains unavailable for the mobile device;

a communications interface configured to provide an offline payment to a recipient of the offline transaction by generating a scannable code on the display of the mobile device or by communicating with a device of the recipient using NFC or Bluetooth; and a transaction pool configured to store the offline transaction after the offline transaction has been performed; and a payment provider server configured to fund the offline transaction when the mobile device communicates the stored offline transaction to the payment provider server while the cellular or Wi-Fi connection becomes available to the mobile device following the offline transactions;

wherein the encrypted transaction processing data comprises behavior information, location history information, and spending pattern information of a user of the mobile device, and wherein:

the behavior information includes a movement of the mobile device or a usage behavior of the mobile device during a previous offline transaction;

the location history information includes a previous location of the user when a previous offline transaction was conducted; and the spending pattern information includes a previous purchase made by the user as a part of a previous offline transaction.

13. The system of claim 12, wherein the payment provider server comprises an additional encrypted data store and an additional risk assessment engine configured to cooperate to process online transactions responsive to transaction requests received from the mobile device when the mobile device is online.

14. The system of claim 12, wherein the mobile device further comprises:

a limit-checking engine configured to determine whether the offline transaction exceeds a daily monetary limit and a daily transaction number limit.

15. The system of claim 12, wherein the mobile device further comprises a transaction execution service configured to provide the stored offline transaction to the payment provider server when the mobile device is connected to a cellular or Wi-Fi network following the offline transaction.

16. The system of claim 12, further comprising:

the device of the recipient, the device of the recipient being configured to scan the scannable code or conduct an NFC or Bluetooth communication with the communications interface of the mobile device while the cellular or Wi-Fi connection remains unavailable for the mobile device.

17. The mobile device of claim 1, further comprising GPS circuitry configured to collect the location history information.

18. The mobile device of claim 1, wherein the mobile device captures the risk assessment data before the offline payment and after the offline payment.

19. The method of claim 7, wherein the capturing is performed before the providing of the offline payment and after the providing of the offline payment.

20. The system of claim 12, wherein the mobile device captures the risk assessment data before the offline payment and after the offline payment.

* * * * *